F. E. LESLEY.
STOVE.
APPLICATION FILED APR. 5, 1909.

947,829.

Patented Feb. 1, 1910.

WITNESSES:
Harry A. Beines.
Jos. A. Michel

INVENTOR.
Frank E. Lesley
BY
ATTORNEY.

UNITED STATES PATENT OFFICE.

FRANK E. LESLEY, OF ST. LOUIS, MISSOURI, ASSIGNOR OF ONE-HALF TO CHARLES S. WILCOX, OF ST. LOUIS, MISSOURI.

STOVE.

947,829.  Specification of Letters Patent.  Patented Feb. 1, 1910.

Application filed April 5, 1909. Serial No. 488,021.

*To all whom it may concern:*

Be it known that I, FRANK E. LESLEY, a citizen of the United States, residing at St. Louis, State of Missouri, have invented certain new and useful Improvements in Stoves, of which the following is a full, clear, and exact description, reference being had to the accompanying drawings, forming a part hereof.

My invention has relation to improvements in heating stoves; and it consists in the novel details of construction more fully set forth in the specification and pointed out in the claim.

Figure 1:
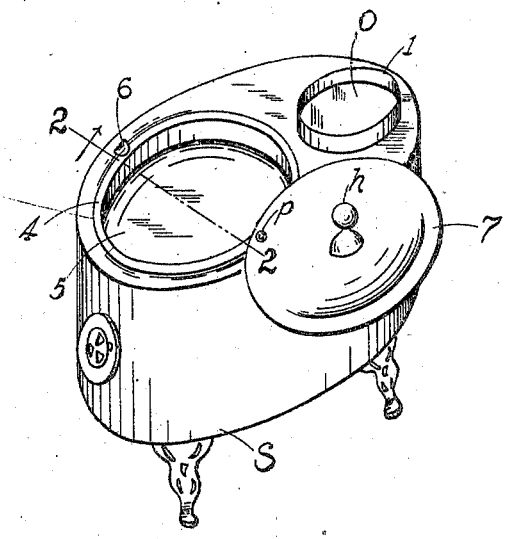
Figure 2:
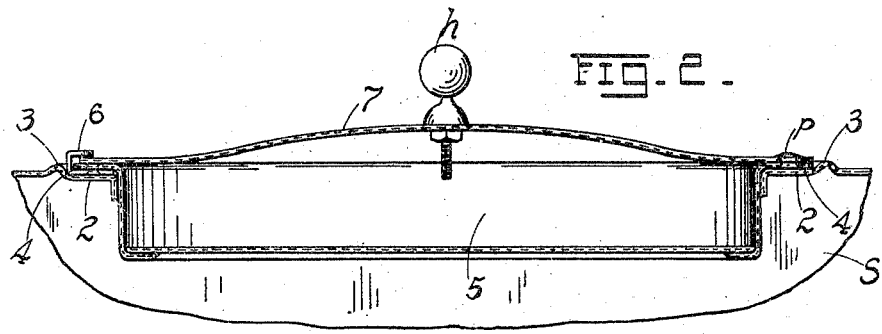
Figure 3:
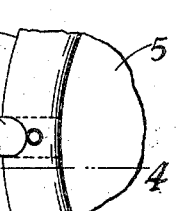
Figure 4:
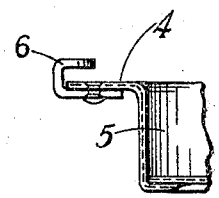

In the drawings, Figure 1 is a perspective of a wood-stove showing my invention applied thereto, with the hood carried by the lid-pan swung to one side; Fig. 2 is an enlarged vertical section of the pan and hood on the line 2—2 of Fig. 1, with hood however swung to locked position; Fig. 3 is a top plan of a section of the pan; and Fig. 4 is a vertical section on the line 4—4 of Fig. 3.

The object of my invention is to provide the fuel feed-opening of an ordinary wood stove with a lid having the form of a pan so that it may be utilized for culinary purposes such as poaching, frying or scrambling eggs, or as a convenient means for supporting pots, kettles and the like with a view of heating the contents of the same, such pan taking the place of the ordinary hood by which the fuel feed-opening is generally closed in the prevailing constructions of wood stoves.

The advantages of the invention will be best apparent from a detailed description thereof which is as follows:—Referring to the drawings, S, represents a conventional form of casing for wood heating stoves, having a flange 1 for connection with the smoke-pipe (not shown). Located adjacent to the flange 1 is the usual opening through which the wood or other fuel is inserted, the opening having its immediate encompassing wall or ledge 2 stiffened by a bead 3. Upon the ledge 2 is adapted to rest the outer upper flange 4 of a pan 5, which pan is thus depressed below the surface of the stove top as shown, bringing the permanently closed bottom of the pan close to the products of combustion passing into the outlet or discharge opening O. Riveted to the flange 4 is an outer inwardly projecting lip 6 which projects over the flange, the space between the flange and lip being adapted to receive the edge of a hood 7 which is pivotally secured to the flange 4 at a point diametrically opposite the lip 6. The parts are so proportioned that when the hood is swung to an open position about its pivotal pin, the flange 1 will arrest it in its sweep by the time it is swung fully open. The opening which the pan 5 covers is substantially circular with just sufficient elongation in one direction to prevent the pan from turning to any extent within the opening, and insuring the positioning of the pan substantially as shown in Fig. 1, that is to say with the line connecting the lip 6 with the pivot $p$ of the hood, substantially at right angles to the major axis of the cross section of the stove which is more or less oval in design.

Should it be desirable to use the pan for any simple culinary purpose such as before mentioned, the hood 7 is simply swung to one side (Fig. 1) when the pan is ready for use. To lift the pan out of the stove, the hood is swung back into locking engagement with the lip 6 (Fig. 2) and by seizing the hood by the knob or handle $h$ the pan may be picked up with its contents. In the same manner may its removal be effected when occasion arises to introduce fuel into the stove.

Having described my invention what I claim is:

In combination with a stove casing provided with a fuel opening in the top and an exit opening, a pan having a permanently closed bottom depressed below the stove top and provided with an upper marginal flange resting on the top around the fuel opening, a lip secured to the flange and overhanging the same, and a hood pivotally secured to the flange of the pan at a point opposite the lip, and adapted to be swung into locked position with the lip, whereby the hood and pan may be lifted from the stove, substantially as set forth.

In testimony whereof I affix my signature, in presence of two witnesses.

FRANK E. LESLEY.

Witnesses:
EMIL STAREK,
JOS. A. MICHEL.